United States Patent [19]

Fujie et al.

[11] Patent Number: 5,375,014
[45] Date of Patent: Dec. 20, 1994

[54] VEHICLE RETRACTABLE MIRROR DEVICE

[75] Inventors: Naofumi Fujie, Nagoya; Hidekazu Kogita, Kariya; Hideki Kawabata, Toyota; Keiji Mori, Kariya, all of Japan

[73] Assignee: Aisin Seiki Kabushiki Kaisha, Kariya, Japan

[21] Appl. No.: 949,160

[22] Filed: Sep. 23, 1992

[30] Foreign Application Priority Data

Sep. 30, 1991 [JP] Japan .................. 3-252331

[51] Int. Cl.5 .................. G02B 7/18; B60R 1/06
[52] U.S. Cl. .................. 359/841; 359/877; 248/486
[58] Field of Search .......... 359/841, 843, 872, 873, 359/874, 877; 248/479, 480, 481, 484, 485, 486, 487, 549, 900

[56] References Cited

U.S. PATENT DOCUMENTS

| | | | |
|---|---|---|---|
| 3,937,563 | 2/1976 | Frabe | 359/841 |
| 4,165,156 | 8/1979 | O'Connell | 248/484 |
| 4,247,173 | 1/1981 | Vitaloni | 359/841 |
| 4,466,594 | 8/1984 | Sharp | 248/484 |
| 4,558,930 | 12/1988 | Deedreek | 359/841 |
| 4,613,107 | 9/1986 | Vitaloni | 248/481 |
| 4,988,068 | 1/1991 | Yamana et al. | 359/841 |

FOREIGN PATENT DOCUMENTS

| | | | |
|---|---|---|---|
| 0194952 | 8/1987 | Japan | 359/877 |
| 0261557 | 11/1987 | Japan | 359/877 |
| 2-36764 | 10/1990 | Japan | |
| 3-19485 | 4/1991 | Japan | |

*Primary Examiner*—Ricky D. Shafer
*Attorney, Agent, or Firm*—Finnegan, Henderson, Farabow, Garrett and Dunner

[57] ABSTRACT

A vehicle retractable mirror structure comprising an arm member mounted on a vehicle body for a pivotable movement relative to the vehicle body between an operative position wherein the arm member projects sidewardly with respect to the vehicle body and a retracted position wherein the arm member is positioned close to the vehicle body, and a mirror assembly mounted on the arm member for a pivotable movement with respect to the arm member. There is provided an interconnecting motion transmitting mechanism between the arm member and the mirror assembly for moving the mirror assembly with the arm member so that the mirror assembly is moved to an operative position wherein the mirror member is projected sidewardly with respect to the vehicle body when the arm member is moved to the operative position and a retracted position wherein the mirror member is positioned close to the vehicle body when the arm member is moved to the retracted position. There is further provided a driving mechanism for driving the arm member between the operative position and the retracted position whereby the mirror assembly is moved with respect to the arm member when the arm member is driven by the driving mechanism.

8 Claims, 6 Drawing Sheets

VEHICLE RETRACTABLE MIRROR DEVICE

BACKGROUND OF THE INVENTION

1. Field of the Invention

The present invention relates to vehicle mirror structures, and more particularly to retractable mirror structure for vehicles. More specifically, the present invention pertains to vehicle mirror structures which are located on and outside the vehicle body for providing drivers with rearward views and can be moved between an operative position wherein the mirrors are projected sidewardly of the vehicle body and a retracted position wherein the mirrors are placed in positions close to the vehicle body.

2. Description of the Prior Art

In Japanese utility model publication Hei 3-19485 discloses a vehicle retractable mirror structure which includes an arm member pivotable with respect to the vehicle body and a mirror supported by the arm member. A driving mechanism is provided for pivotably moving the arm member with respect to the vehicle body so that the arm member and the mirror are moved together between an operative position wherein the mirror projects sidewardly from the contour of the vehicle body and a retracted position wherein the mirror and the arm member are located close to the vehicle body.

In this known structure, the arm member is moved to the retracted position with the mirror in an orientation wherein the mirror is positioned with respect to the arm member in the operative position. In order to avoid possible interference with the vehicle body in the retracted position of the mirror structure under any possible orientation of the mirror with respect to the arm member, it has been necessary to maintain a certain clearance between the mirror structure and the vehicle body. Therefore, in this mirror structure, it is difficult to locate the mirror sufficiently close to the vehicle body in the retracted position.

In the Japanese utility model publication Hei 2-36764, there is disclosed a vehicle retractable mirror structure which includes a mirror pivotable on an arm member which is mounted fixedly on the vehicle body. A diving mechanism is provided for driving the mirror between an operative position and a retracted position. This structure is not satisfactory because the mirror cannot be retracted to a position sufficiently close to the vehicle body. A combination of the aforementioned two different types of mirror structures would not provide a satisfactory structure because there would be required to provide driving mechanisms for both the pivotable arm member and the pivotable mirror.

SUMMARY OF THE INVENTION

It is therefore an object of the present invention to provide a vehicle retractable mirror structure which is simple in construction but can locate the mirror at a position close to the vehicle body in the retracted position.

Another object of the present invention is to provide a vehicle retractable mirror structure wherein the mirror and the supporting arm member can be driven between the operative position and the retracted position through a common driving mechanism.

The above and the other objects can be accomplished according to the present invention by a vehicle retractable mirror structure comprising arm means mounted on a vehicle body for a pivotable movement relative to the vehicle body between an operative position wherein the arm means projects sidewardly with respect to the vehicle body and a retracted position wherein the arm means is positioned close to the vehicle body, mirror means mounted on said arm means for a pivotable movement with respect to the arm means. There is provided interconnecting means between the arm means and the mirror means for moving the mirror means with the arm means so that the mirror means is moved to an operative position wherein the mirror means is projected sidewardly with respect to the vehicle body when the arm means is moved to the operative position and a retracted position wherein the mirror means is positioned close to the vehicle body when the arm means is moved to the retracted position. There is further provided driving means for driving the arm means between the operative position and the retracted position whereby the mirror means is moved with the arm means when the arm means is driven by the driving means.

According to the features of the present invention, the driving means is operated to move the arm means to the retracted position. The movement of the arm means is then transmitted through the interconnecting means to the mirror means so that the mirror means is also moved to the retracted position.

The above and other objects and features of the present invention will become apparent from the following description of the preferred embodiment taking reference to the accompanying drawings.

DESCRIPTION OF THE PREFERRED EMBODIMENT

Figure 1:
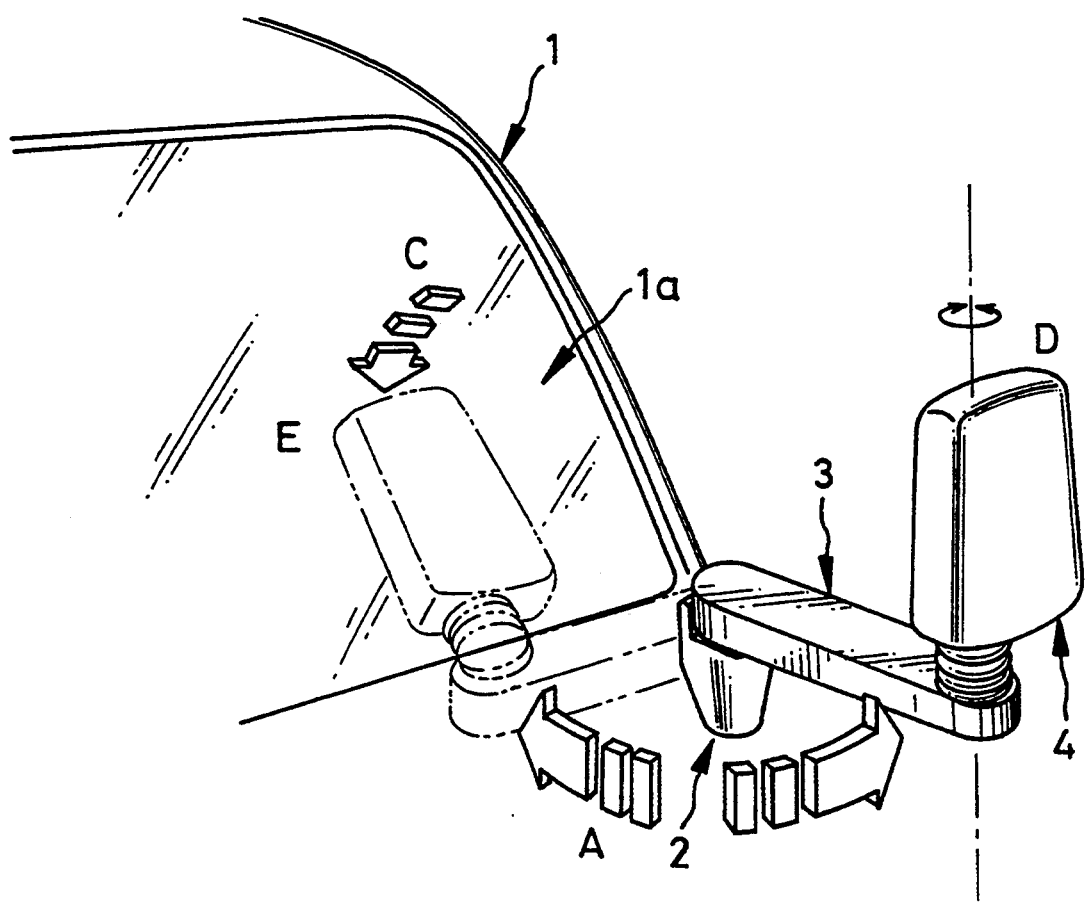
FIG. 1 is a perspective view of the vehicle retractable mirror structure in accordance with one embodiment of the present invention.

Referring to the drawings, particularly to FIG. 1, there is shown a vehicle retractable mirror structure located at a lower side corner of a front windshield 1a of a vehicle body 1 for providing a driver with side and rearward view. The mirror structure includes a base member 2 secured to the vehicle body 1. An arm member 3 extends substantially horizontally and is supported at one end on the base member 2 for a pivotable or swingable movement about a substantially vertical axis. The arm member 3 carries a mirror 4 at the other end. The mirror 4 extends vertically from the arm member 3 and pivotable about a substantially vertical axis.

As shown in FIG. 1, the arm member 3 is swingable from a position shown by a solid line to a retracted position shown by a broken line wherein the arm member 3 lies substantially along the lower edge of the front windshield 1a.

Figure 3:
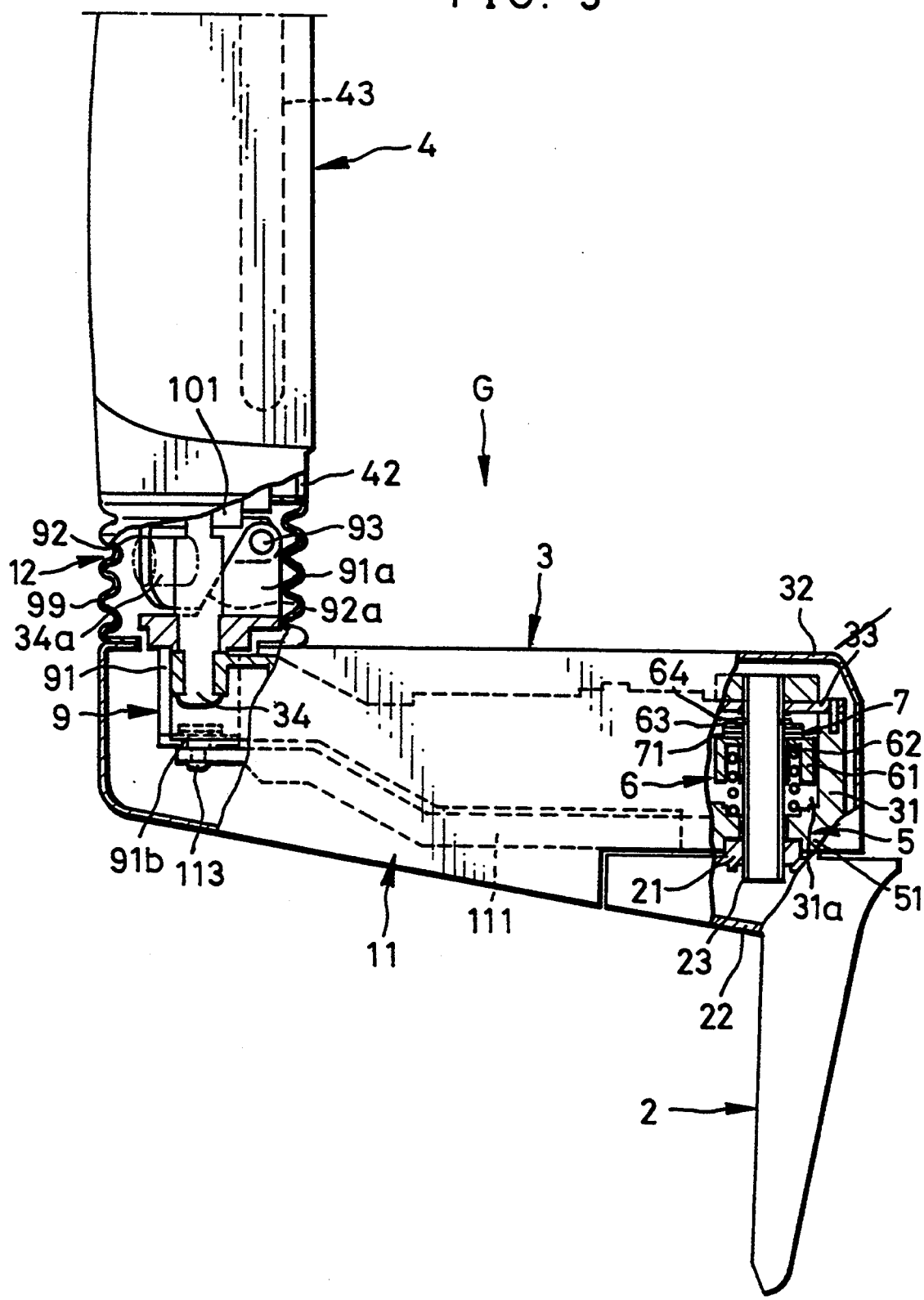
FIG. 3 is a sectional view taken substantially along the line F—F in FIG. 2.

Referring to FIG. 3, it will be noted that the base member 2 comprises a base fitting 21 and a base casing 22 which is secured to and covers the base fitting 21. A post 23 is provided on the base fitting 21 and extends vertically upwards from the base fitting 21. The arm member 3 comprises a base 31 and a casing 32 which is secured to and covers the base 31. The base 31 is mounted on the post 23 for rotation about the axis of the post 23. In this manner, the arm member 3 is mounted on the base member 2 for rotation about a vertical axis.

A clutch mechanism 5 is provided between the base fitting 21 of the base member 2 and the base 31 of the arm 3. The clutch mechanism 5 includes a friction plate 51 which is secured to the base fitting 21 and frictionally engaged with the base 31 of the arm 3. The frictional engagement between the friction plate 51 and the base 31 of the arm 3 is such that the base 31 can be slidably moved with respect to the friction plate 51 when a driving torque is applied to the arm 3 by a driving mechanism 8 which will be described later.

Between the base member 2 and the arm member 3, there is provided a first motion transmitting mechanism 6 which is located in a cavity 31a formed in the base 31. The mechanism 6 includes a gear 61 which is supported for rotation by the post 23. A spring 62 is provided around the post 23 to extend between the gear and the base 31 for biasing the gear 61 upward as shown in FIG. 3. On the post 23, there is provided a second clutch 7 which includes a clutch plate 71 located above the gear 61. The clutch plate 71 is retained on the post 23 by means of an E-ring 64 which engages the clutch plate 71 through a washer 63. The spring 62 forces the gear 61 toward the clutch plate 71 for a frictional engagement between the gear and the clutch plate 71. The biasing force of the spring 61 is such that the gear 61 is not disengaged even when the driving torque is applied from the driving mechanism 8.

Figure 4:
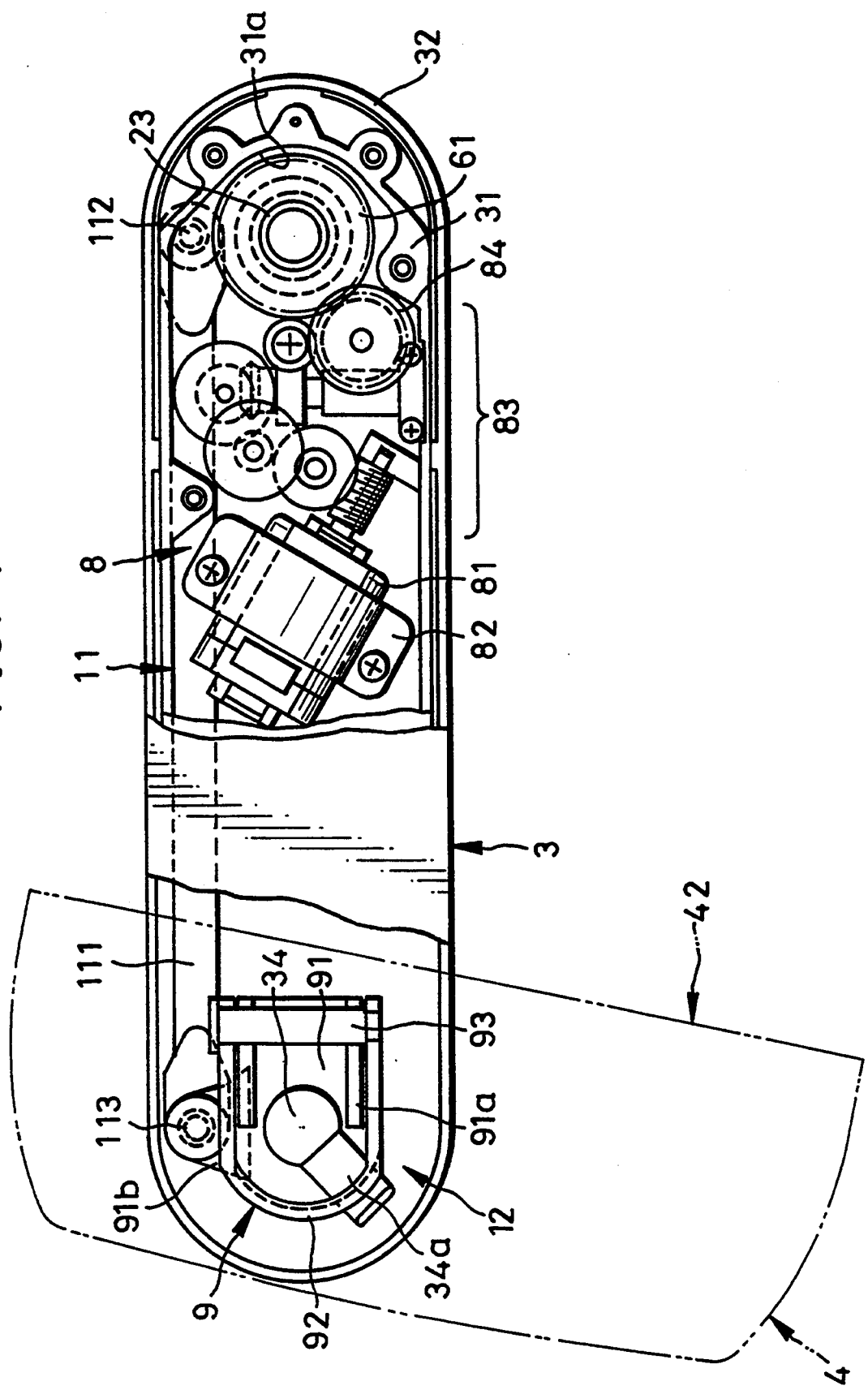
FIG. 4 is a view as seen in the direction of an arrow G in FIG. 3.
Figure 5:
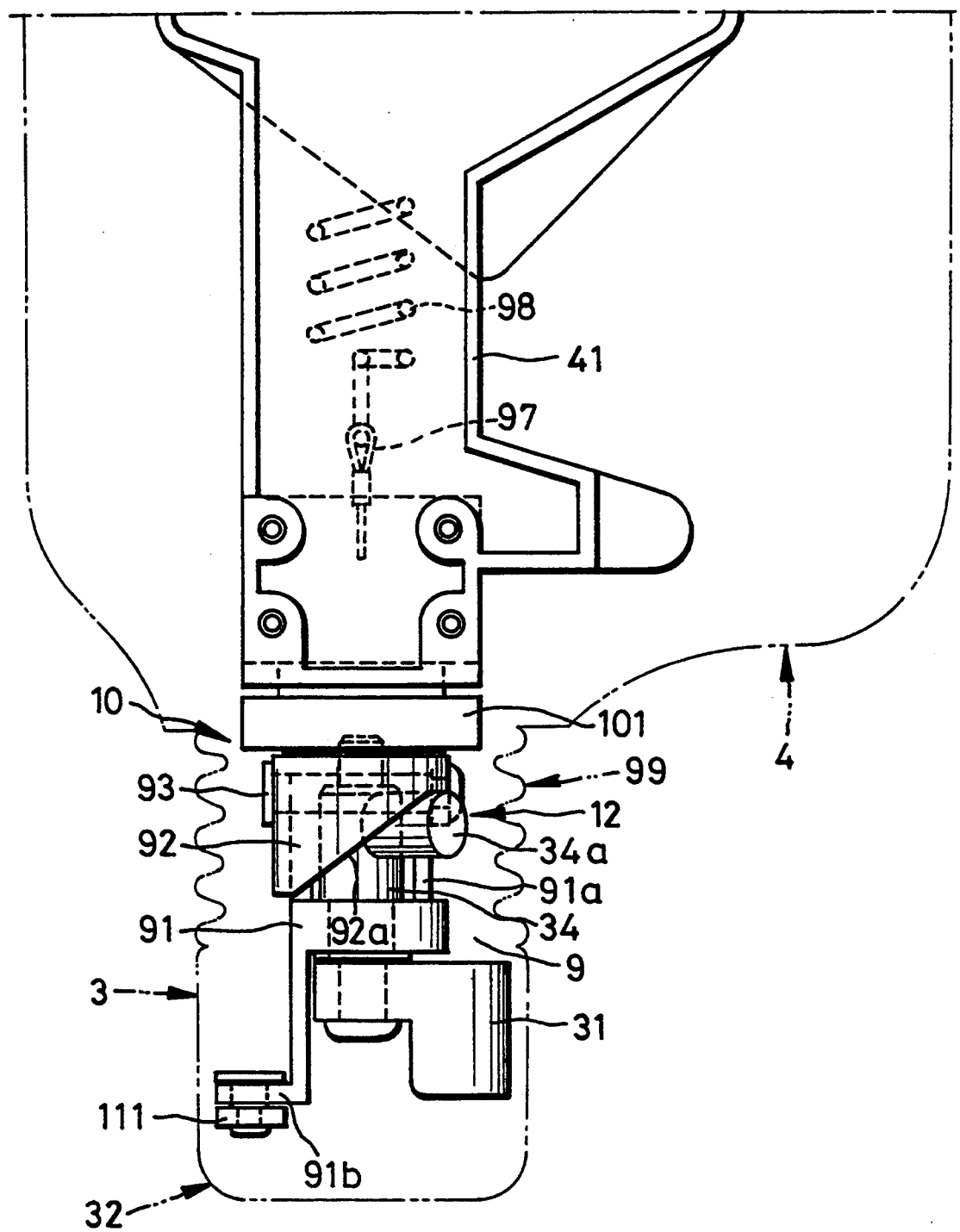
FIG. 5 is a view as seen in the direction of an arrow H in FIG. 2.

The driving mechanism 8 is located in the cavity 31a and includes a motor 81 which is secured through a bracket 82 to the base 31. As shown in FIG. 4, the motor 81 has an output shaft connected through a speed reduction gear mechanism 83 comprised of a plurality of gears with a planetary gear 84 which is in meshing engagement with the gear 61. The planetary gear 84 is carried by a planetary carrier so that it can revolve around the gear 61.

As shown in FIGS. 3 through 6, the base 31 has a post 34 located at an end of the base 31 opposite to the end where the post 23 is located. A mirror assembly 4 is provided and includes a base casing 41 and a body 42 which is secured to the base casing 41. The body 42 has an opening where a mirror 43 is located. There is a second motion transmitting mechanism 9 provided between the arm member 3 and the mirror assembly 4.

The second motion transmitting mechanism 9 includes a ring bracket 91 which is carried by the post 34 for rotation about the post 34. The ring bracket 91 is formed with a flange 91a which is parallel with the post 34 and a flange 91b which is perpendicular to the post 34. A cam bracket 92 is carried on the flange 91a by means of a pin 93 for rotation about an axis which is perpendicular to the axis about which the ring bracket 91 rotates.

There is a third clutch mechanism 10 between the cam bracket 92 and the base casing 41. The clutch mechanism 10 includes a clutch plate 101 which is provided on the base casing 41 and adapted to engage with the cam bracket 92 with a biasing force which would not be disengaged even under a driving torque applied through the first motion transmitting mechanism 6 and an interconnecting mechanism 11 which will be described later.

The clutch plate 101 is biased toward the cam bracket 92 by means of a spring 96 which is mounted on a rod 92b formed on the base casing 41 to act between the clutch plate 101 and a washer 94 on the rod 92b which is maintained on the rod 92b by means of an E-ring 95. The clutch plate 101 is further biased toward the cam bracket 92 by means of a spring 98 which is disposed to act between the base casing 41 and the post 34. For the purpose, the spring 98 is placed at one end on the base casing 41 and connected at the other end through a cable 97 with the post 34. The biasing force by the springs 96 and 98 forces the clutch plate 101 into a frictional engagement with the cam bracket 92. In this manner, the mirror assembly 4 is mounted on the arm member 3.

Figure 6:
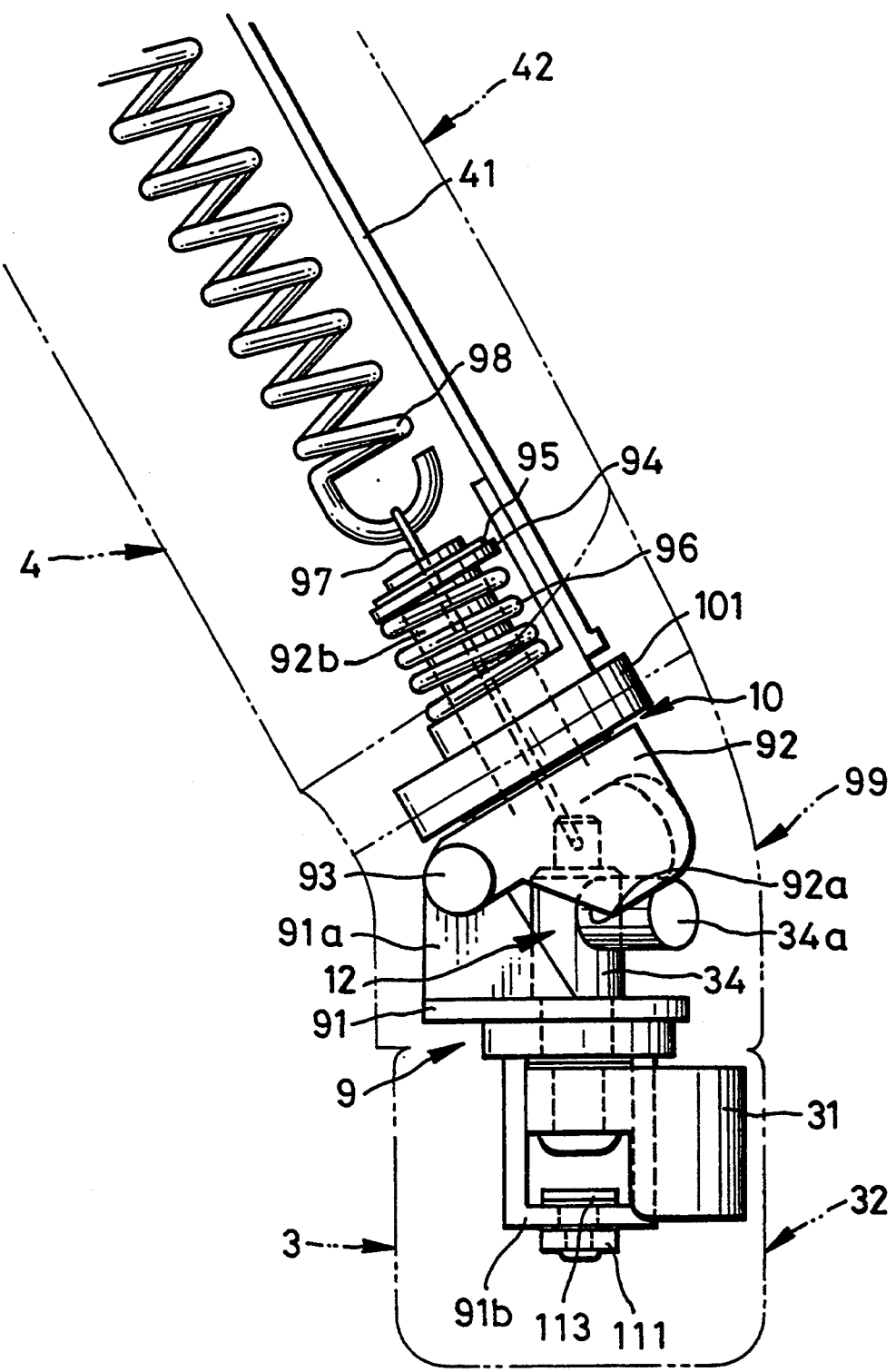
FIG. 6 is a view as seen in the direction of an arrow I in FIG. 2.

Referring to FIG. 6, it will be noted that the post 34 is formed with a cam rod 34a which is adapted to engage a cam surface 92a of the cam bracket 92. The biasing force of the spring 98 forces the mirror assembly 4 toward the arm member 3 so that the cam surface 92a of the cam bracket 92 is biased under the force of the spring 98 into engagement with the cam rod 34a. The structure comprising the cam bracket 92 and the cam rod 34a provides a tiltable mechanism 12. A bellows type cover 99 is provided to cover the structures described above.

Figure 2:
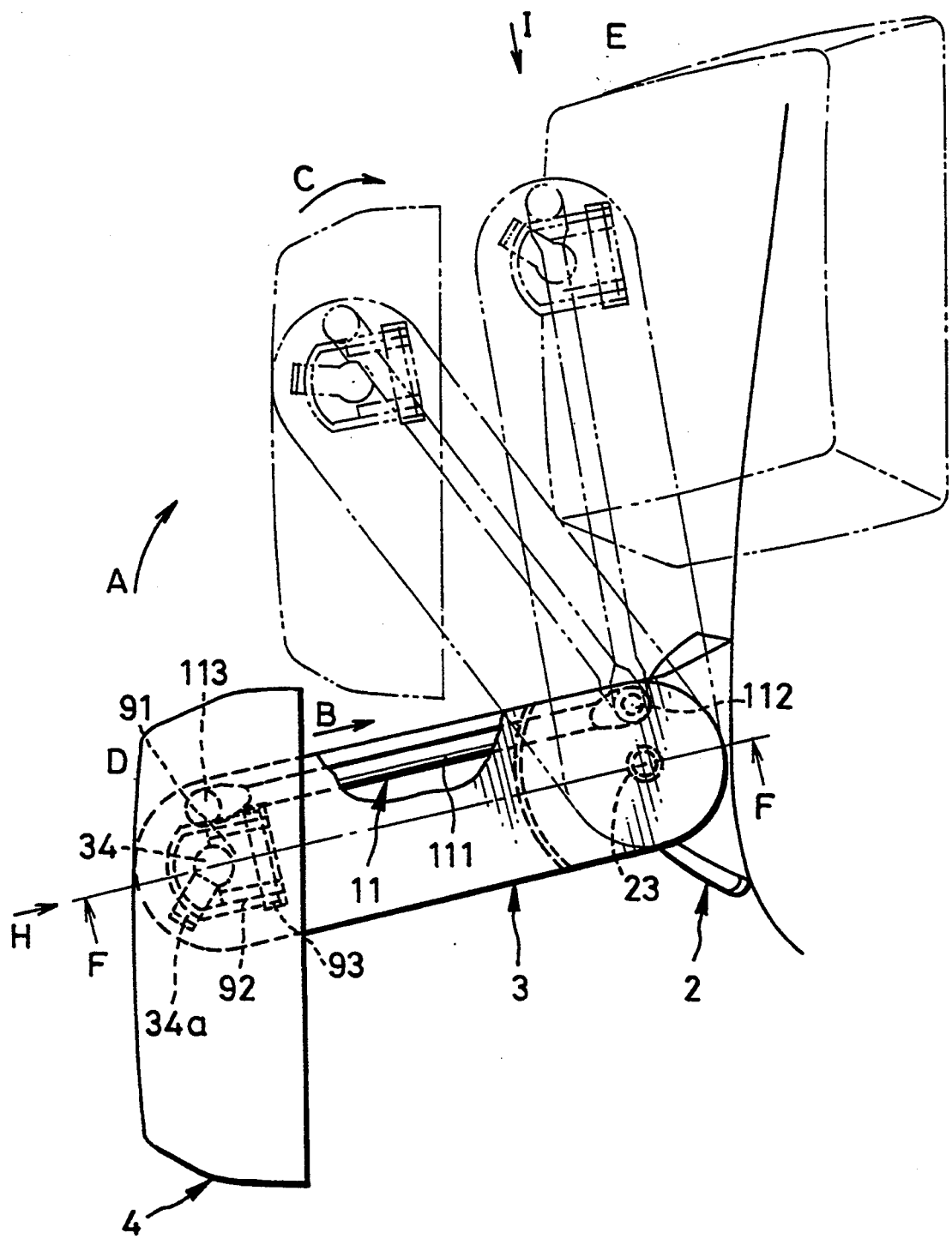
FIG. 2 is a perspective view showing the operation of the mirror structure shown in FIG. 1.

Referring further to FIGS. 2 and 6, it will be noted that a link 111 is provided beneath the base 31 of the casing 32. The link 111 is supported pivotably at one end on the base 31 by means of a pin 112. The other end of the link 111 is connected to the flange 91b of the link bracket 91 for a pivotable movement by means of a pin 113. A linkage mechanism 10 is provided by the link 111 and the base 31.

Now, the operation of the mechanism described above will be described referring to FIGS. 1 and 2. The mirror assembly 4 is shown in an operative position by solid lines wherein the mirror assembly 4 is projected sidewardly from the vehicle body 1. In this position, when the motor 81 is operated, the planetary gear 84 is driven through the speed reduction gear mechanism 83. As described, the planetary gear 84 is in meshing engagement with the gear 61. Since the gear 61 is held stationary on the post 23 by means of the second clutch mechanism, the planetary gear 84 revolves around the gear 61. Thus, the first clutch mechanism 5 is disengaged and the arm member 3 is rotated in the direction shown by an arrow A in FIGS. 1 and 2. The rotation of the arm member 3 causes the link 111 to be pulled in the direction shown by an arrow B in FIG. 2, so that the link bracket 91 is rotated about the post 34. Thus, the mirror assembly 4 is rotated through the third clutch mechanism 10 with respect to the together with the cam bracket 92.

In this instance, the cam rod 34a is moved slidably along the cam surface 92a so that the cam bracket 92 is rotated about the pin 93 to thereby make the mirror assembly 4 tilt in the direction shown by an arrow C in FIGS. 1 and 2. As the result, the mirror assembly 4 is moved to a retracted position E shown by broken lines in FIGS. 1 and 2 wherein it is placed close to the vehicle body 1 and lies substantially along the arm member 3 and the front windshield 1a. The motor 81 is stopped when the position sensor 12 detects that the arm member 3 is moved to the retracted position E. The mirror assembly 4 and the arm member 3 can be moved to the operative position D by operating the motor 81 in the opposite direction. When an external force is applied to the mirror assembly 4 when it is in the operative position, the second and third clutch mechanisms 7 and 10 are disengaged to avoid possible damages in the structures.

As described, when the arm member 3 is swingably moved between the operative position and the retracted position, the mirror assembly 4 is moved synchronously so that the mirror assembly 4 is placed when it is retracted in a position where it lies substantially along the arm member 3 and the front windshield 1a. In this retracted position, the mirror assembly 4 is placed close to the vehicle body 1 so that it is possible to avoid any interference with the front windshield 1a and to prevent any possible damages and contaminations due to external objects such as stones and the like. The link bracket 91 and the cam bracket 92 are moved about the post 34 and the pin 93, respectively, through the movement of the link 111 in response to the rotation of the arm member 3. It is therefore possible to obtain the operation of the mirror assembly 4 and the arm member 3 through a common driving mechanism 8. The structure is therefore simple and light in weight. The first and second motion transmitting mechanisms 6 and 9 and the tilting mechanism 12 as well as the driving mechanism 8 are housed in the arm member to provide a good appearance.

In the structure described above, the mirror assembly is mounted on the vehicle front body. It should however be noted that the mirror assembly can be mounted on the vehicle side door as well.

The invention has thus been shown and described with reference to a specific embodiment, however, it should be noted that the invention is in no way limited to the details of the illustrated structures but changes and modifications may be made without departing from the scope of the appended claims.

We claim:

1. A retractable vehicle rearview mirror device for mounting on a vehicle body to project outwardly of the vehicle body when in an operative position and to extend closer to an outer surface of the vehicle body when in a retracted position, comprising:
   an arm having one end for swingably mounting the arm to the vehicle body;
   a mirror having a reflecting surface movably mounted to an opposite end of the arm longitudinally spaced from the one end;
   interconnecting means for mechanically coupling the mirror to the one end of the arm to movably position the reflective surface of the mirror relative to the arm to face rearwardly of the vehicle when in the operative position and to position the surface of the mirror relative to the arm to be disposed adjacent the vehicle surface at times when the mirror device is mounted to the vehicle and the mirror device is in a retracted position; and
   driving means coupled to the interconnecting means for moving the arm relative to the vehicle body and the mirror relative to the arm concurrently between the operative position and the retracted position.

2. A mirror device in accordance with claim 1 wherein said interconnecting means includes means for moving said mirror relative to said arm so that the reflective surface of the mirror extends substantially along said arm when the mirror is in said retracted position.

3. A mirror device in accordance with claim 2 wherein said interconnecting means includes means for moving said mirror relative to the arm to position the surface of the mirror substantially along a surface of a vehicle body.

4. A mirror device in accordance with claim 2 wherein said interconnecting means includes cam means for positioning the mirror surface substantially parallel to the body surface.

5. A mirror device in accordance with claim 1 Wherein said arm has a hollow interior, and the interconnecting means and said driving means are housed in said arm.

6. A retractable vehicle rear view mirror device for mounting on a vehicle body to project outwardly of the vehicle body when in an operative position and to extend close to an outer surface of the vehicle body when in a retracted position, comprising:
   an arm having one end for pivotally mounting the arm to the vehicle body;
   a mirror having a reflective surface pivotally mounted to an opposite end of the arm longitudinally spaced from the one end;
   a first mechanism mounted to the one end of the arm for positioning the first mechanism between the one end of the arm and the vehicle body;
   a second mechanism mounted between the opposite end of the arm and the mirror; and
   driving means coupled to both the first and second mechanisms for driving concurrently the first mechanism and the second mechanism to rotate the mirror relative to the arm and the arm relative the body to position the surface of the mirror along the surface of the vehicle body when the arm is rotated to the retracted position.

7. A mirror device in accordance with claim 6 wherein the second mechanism includes bracket means supporting the mirror and rotated by the common driving means.

8. A mirror device in accordance with claim 6 wherein the driving means includes a pin for deriving its rotation, the second mechanism includes a first bracket secured to the vehicle body, a second bracket supporting the mirror, pivoted to the first bracket and having a cam portion which is in abutment with the pin of the driving means.

* * * * *